United States Patent
Kikuchi et al.

(10) Patent No.: US 11,025,056 B2
(45) Date of Patent: Jun. 1, 2021

(54) POWER CONVERSION APPARATUS, POWER CONVERSION SYSTEM, AND METHOD FOR CONTROLLING POWER CONVERSION APPARATUS

(71) Applicant: Panasonic Intellectual Property Management Co., Ltd., Osaka (JP)

(72) Inventors: Akihiro Kikuchi, Osaka (JP); Kenji Hanamura, Osaka (JP); Tomoki Ito, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/475,611

(22) PCT Filed: Jan. 22, 2018

(86) PCT No.: PCT/JP2018/001801
§ 371 (c)(1),
(2) Date: Jul. 2, 2019

(87) PCT Pub. No.: WO2018/142987
PCT Pub. Date: Aug. 9, 2018

(65) Prior Publication Data
US 2019/0326752 A1 Oct. 24, 2019

(30) Foreign Application Priority Data
Feb. 2, 2017 (JP) ............................. JP2017-017924

(51) Int. Cl.
*H02J 1/00* (2006.01)
*H02J 3/00* (2006.01)
(Continued)

(52) U.S. Cl.
CPC ................ *H02J 1/102* (2013.01); *H02J 3/28* (2013.01); *H02J 3/383* (2013.01); *H02M 1/00* (2013.01);
(Continued)

(58) Field of Classification Search
CPC .... H02J 1/102; H02J 3/28; H02J 3/383; H02J 2300/24; H02J 7/34; H02J 3/38; H02J 1/10; H02M 3/00
See application file for complete search history.

(56) References Cited

U.S. PATENT DOCUMENTS

2011/0100735 A1* 5/2011 Flett .......................... B60L 7/22
180/65.22
2011/0273022 A1* 11/2011 Dennis ...................... H02J 7/34
307/72
(Continued)

FOREIGN PATENT DOCUMENTS

EP 2498364 A1 * 9/2012 ................ H02J 3/32
EP 2498364 A1 9/2012
(Continued)

OTHER PUBLICATIONS

International Search Report issued in corresponding International Patent Application No. PCT/JP2018/001801, dated Mar. 27, 2018, with English translation.
(Continued)

*Primary Examiner* — Rexford N Barnie
*Assistant Examiner* — Rasem Mourad
(74) *Attorney, Agent, or Firm* — McDermott Will & Emery LLP

(57) ABSTRACT

In a power converter, a DC bus is supplied with a DC power from a voltage conversion circuit for regulating a voltage of a power output from a DC power supply, a voltage of the DC power being regulated by the voltage conversion circuit. An inverter converts a DC power on the DC bus into an AC power and supplies the AC power as converted to a power
(Continued)

system. A controller controls the inverter. When it is necessary to suppress an output, the controller suppresses the AC power supplied by the inverter to increase a voltage on the DC bus.

14 Claims, 3 Drawing Sheets

(51) Int. Cl.
    *H02J 1/10*     (2006.01)
    *H02J 3/28*     (2006.01)
    *H02J 3/38*     (2006.01)
    *H02M 1/00*     (2006.01)
    *H02S 40/32*     (2014.01)
    *H02M 3/00*     (2006.01)
    *H02M 7/44*     (2006.01)

(52) U.S. Cl.
    CPC ........... *H02S 40/32* (2014.12); *H02J 2300/24* (2020.01); *H02M 3/00* (2013.01); *H02M 7/44* (2013.01); *H02M 2001/007* (2013.01)

(56) References Cited

U.S. PATENT DOCUMENTS

2012/0299383 A1* 11/2012 Cyuzawa ................ H02J 3/381
    307/75
2015/0244255 A1* 8/2015 Chen ........................ H02M 7/48
    363/97
2017/0187191 A1* 6/2017 Kojima ................... H02M 3/04

FOREIGN PATENT DOCUMENTS

| JP | 2014-128047 A | 7/2014 |
| JP | 2014-230455 A | 12/2014 |
| WO | 2011/055186 A1 | 5/2011 |

OTHER PUBLICATIONS

Extended European Search Report issued in corresponding European Patent Application No. 18747910.0, dated Dec. 16, 2019.

* cited by examiner

POWER CONVERSION APPARATUS, POWER CONVERSION SYSTEM, AND METHOD FOR CONTROLLING POWER CONVERSION APPARATUS

CROSS-REFERENCE TO RELATED APPLICATIONS

This application is the U.S. National Phase under 35 U.S.C. § 371 of International Application No. PCT/JP2018/001801, filed on Jan. 22, 2018, which claims the benefit of Japanese Application No. 2017-017924, filed on Feb. 2, 2017, the entire contents of each are hereby incorporated by reference.

TECHNICAL FIELD

The present disclosure relates to a power converter, a power conversion system, and a method of controlling a power converter adapted to convert a power supplied from a DC power supply and output the power as converted.

BACKGROUND ART

A power conversion system in which a DC/DC converter, a bidirectional inverter, and a bidirectional DC/DC converter are connected to a DC bus is known (see, for example, patent document 1). The DC/DC converter boosts the DC voltage generated by the solar cell and outputs the boosted voltage to the DC bus. The bidirectional inverter converts the DC power on the DC bus into an AC power and outputs (sells) the power as converted to a commercial power system (hereinafter, merely referred to as a power system). When the output power of the solar cell increases, the bidirectional DC/DC converter converts the DC power on the DC bus into a desired DC power and charges the power storage device accordingly. When the output power of the solar cell decreases, the bidirectional DC/DC converter converts the DC power in the power storage device into a desired DC power and outputs the power as converted to the DC bus. The DC/DC converter, the bidirectional inverter, and the bidirectional DC/DC converter, as well as the controller, are integrated in the system.

[patent document 1] JP2014-230455

Technical Problem

The DC/DC converter, the bidirectional inverter, and the bidirectional DC/DC converter are integrated in the power conversion system as described above. In the case of a power conversion system of an integrated type, it is difficult to modify the system configuration. For example, it is difficult to add a power storage function (bidirectional DC/DC converter) to a power conversion system already built for use as a power conversion system (DC/DC converter+inverter) adapted only to solar light, thereby building a generation-storage power conversion system. It would be easy to modify the system configuration by configuring the DC/DC converter, etc. as separate components, but then it would be difficult to control the system to regulate the input and output of power to and from the DC bus because it is impossible to manage the input and output of power to and from the DC bus in an integrated manner.

The disclosure addresses the above-described issue, and a general purpose thereof is to provide a technology capable of changing the configuration of a power conversion system easily and regulating the input and output of power to and from the DC bus.

Solution to Problem

A power converter according to an embodiment of the disclosure includes: a DC bus that is supplied with a DC power from a voltage conversion circuit for regulating a voltage of a power output from a DC power supply, a voltage of the DC power being regulated by the voltage conversion circuit; an inverter that converts the DC power on the DC bus into an AC power and supplies the AC power as converted to a power system; and a controller that controls the inverter. When it is necessary to suppress an output, the controller suppresses the AC power supplied by the inverter to increase a voltage on the DC bus.

Another embodiment of the disclosure related to a power conversion system. The power conversion system includes: a first power converter that includes a DC bus supplied with a power output from a first DC power supply, an inverter that converts a DC power on the DC bus into an AC power and supplies the AC power as converted to a power system, and a first controller that controls the inverter; and a second power converter than includes: a second voltage conversion circuit that regulates a voltage of a power output from a second DC power supply and supplies a DC power with a regulated voltage to the DC bus; and a second controller that controls the second voltage conversion circuit. When it is necessary to suppress an output, the first controller suppresses the AC power supplied by the inverter to increase a voltage on the DC bus, and when the voltage on the DC bus is higher than a predetermined second threshold voltage, the second controller controls the voltage on the DC bus to be equal to or lower than the second threshold voltage, and, when the voltage on the DC bus is lower than the second threshold voltage, the second controller controls the power output from the second DC power supply.

Another embodiment of the present disclosure relates to a power converter. The power converter is connected to another power converter including: an inverter that converts a DC power on a DC bus into an AC power and supplies the AC power as converted to a power system; and a controller that suppresses, when it is necessary to suppress an output, the AC power supplied by the inverter to increase a voltage on the DC bus, the power converter including: a voltage conversion circuit that regulates a voltage of a power output from a DC power supply and outputs the regulated voltage to the DC bus; and a controller that controls, when the voltage on the DC bus is higher than a predetermined threshold voltage, the voltage conversion circuit so that the voltage on the DC bus is equal to or lower than the threshold voltage, and controls, when the voltage on the DC bus is lower than the threshold voltage, the voltage conversion circuit to control the power output from the DC power supply.

Another embodiment of the present disclosure relates to a method of controlling a power converter. The method includes a DC bus that is supplied with a DC power from a voltage conversion circuit for regulating a voltage of a power output from a DC power supply, a voltage of the DC power being regulated by the voltage conversion circuit; and an inverter that converts the DC power on the DC bus into an AC power and supplies the AC power as converted to a power system; the method including: suppressing, when it is necessary to suppress an output, an AC power supplied by the inverter to increase a voltage on the DC bus.

Advantageous Effects of Invention

According to the present disclosure, the configuration of the power conversion system can be modified easily, and the input and output to and from the DC bus are regulated.

DESCRIPTION OF EMBODIMENTS

First Embodiment

Figure 1:
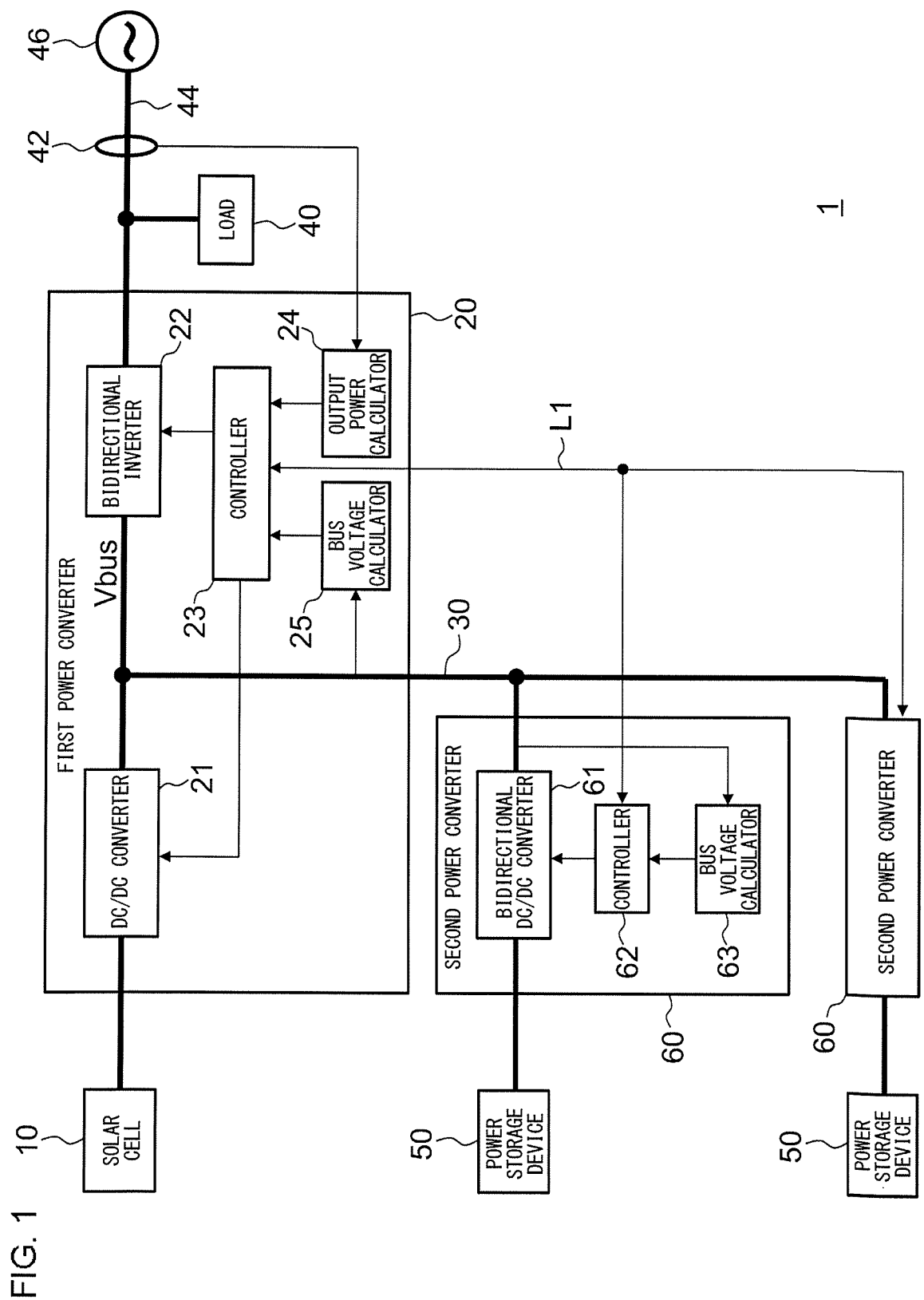
FIG. 1 schematically shows a configuration of a power conversion system according to the first embodiment.

FIG. 1 schematically shows a configuration of a power conversion system 1 according to the first embodiment. The power conversion system 1 includes a solar cell 10, a first power converter 20, a DC bus 30, a load 40, a current detector 42, two power storage devices 50, 50, and two second power converters 60, 60. One each of the power storage device 50 and the second power converter 60 may be provided, or three or more each of the power storage devices 50 and the second power converters 60 may be provided.

The solar cell 10 is a power generator that uses photovoltaic effect to convert light energy into electric power directly. A silicon solar cell, a solar cell made of a compound semiconductor, a dye-sensitized solar cell (organic solar cell) or the like is used as the solar cell 10. The solar cell 10 functions as a DC current source.

The first power converter 20 is also called a power conditioner for solar cells and converts power generated by the solar cell 10 into an AC power. The first power converter 20 includes a DC/DC converter 21, a bidirectional inverter 22, a controller 23 (first controller), an output power calculator 24, and a bus voltage calculator 25.

The DC/DC converter 21 regulates the DC voltage output from the solar cell 10 (converts the DC voltage into a DC voltage of a different value) and outputs the voltage as converted to the DC bus 30. More specifically, the DC/DC converter 21 boosts the DC voltage of the solar cell 10. The DC/DC converter 21 functions as a voltage conversion circuit (first voltage conversion circuit).

The bidirectional inverter 22 is capable of converting the DC power on the DC bus 30 into an AC power and supplying the AC power to the load 40 connected to a power system 46 via a power line 44. In this process, the bidirectional inverter 22 is capable of regulating the voltage Vbus on the DC bus 30 by regulating the AC output power. The bidirectional inverter 22 is also capable of converting the AC power of the power system 46 supplied via the power line 44 into a DC power and outputting the DC power to the DC bus 30.

The controller 23 controls the DC/DC converter 21 and the bidirectional inverter 22. When the bidirectional inverter 22 is outputting an AC power and it is not necessary to suppress the output of the power conversion system 1, the controller 23 controls the bidirectional inverter 22 so that the voltage Vbus on the DC bus 30 approaches a constant voltage Vs.

When the bidirectional inverter 22 is outputting an AC power and it is necessary to suppress the output of the power conversion system 1, the controller 23 controls the bidirectional inverter 22 to suppress the AC output power of the bidirectional inverter 22 and increases the voltage Vbus on the DC bus 30. For example, suppression of the output is necessary when a reverse power flow occurs while the power storage device 50 is discharging power, when a command to suppress the output is provided from outside the power conversion system 1, etc., but the embodiment is non-limiting as to when suppression occurs.

In regard to an inverse power flow, the controller 23 controls the bidirectional inverter 22 to suppress the AC output power in the case an inverse power flow is detected based on a current flowing in the power line 44 detected by the current detector 42 while the power storage device 50 is discharging power. More specifically, the output power calculator 24 calculates the power flowing inversely by referring to the current detected by the current detector 42 and calculates an output power command value to eliminate the calculated power flowing inversely. The controller 23 controls the bidirectional inverter 22 in accordance with the output power command value calculated. In order to suppress the inverse power flow more properly, the controller 23 may suppress the AC power supplied by the bidirectional inverter 22 so that the power flowing inversely is a predetermined negative level or lower. When the power flowing inversely is equal to or lower than the predetermined level, it means that the power is supplied from the power system 46 to the load 40 so that the inverse power flow is suppressed easily.

The controller 23 communicates with the second power converter 60, 60 via the communication line L1 in accordance with a communication scheme that complies with, for example, the RS-485 standard or the TCP-IP standard to control the operation of the second power converter 60, 60. That the power storage device 50 is discharging power is communicated from the second power converter 60 to the controller 23 via the communication line L1.

Further, when the voltage Vbus on the DC bus 30 is higher than a predetermined first threshold voltage Vth1, the controller 23 causes the DC/DC converter 21 to lower the DC voltage output from the DC/DC converter 21 to the DC bus 30 to a level equal to or lower than the first threshold voltage Vth1. The first threshold voltage Vth1 is higher than the constant voltage Vs. More specifically, the bus voltage calculator 25 calculates a bus voltage command value to lower the voltage Vbus on the DC bus 30 when the voltage Vbus on the DC bus 30 is higher than the first threshold voltage Vth1. The controller 23 controls the DC/DC converter 21 in accordance with the bus voltage command value calculated. The bus voltage command value in this case may indicate a value equal to or lower than the first threshold voltage Vth1 and may indicate a value different from the first threshold voltage Vth1. Further, when the voltage Vbus on the DC bus 30 is lower than the first threshold voltage Vth1, and, more specifically, when the voltage Vbus on the DC bus 30 is equal to or lower than a predetermined threshold voltage lower than the first threshold voltage Vth1, the controller 23 controls the DC/DC converter 21 to track the maximum power point of the output power of the solar cell 10.

The two power storage devices 50, 50 have the same function, and the two second power converters 60, 60 have the same function so that the following description concerns a single power storage device 50 and a single second power converter 60.

The power storage device 50 is capable of discharging power and is exemplified by a lithium ion battery, a nickel hydride storage battery, a lead storage battery, an electric double layer capacitor, a lithium ion capacitor, or the like. The power storage device 50 functions as a DC power supply. The DC power output from the power storage device 50 is supplied to the second power converter 60.

The second power converter 60 charges or discharges the power storage device 50. The second power converter 60 is connected to the first power converter 20 by the DC bus 30 and the communication line L1. The second power converter 60 includes a bidirectional DC/DC converter 61, a controller 62 (second controller), and a bus voltage calculator 63.

The bidirectional DC/DC converter 61 is capable of converting a voltage bidirectionally and is capable of regulating the DC voltage output from the power storage device 50 (converts the DC voltage into a DC voltage of a different value) to output the voltage as converted to the DC bus 30 and regulating the DC voltage on the DC bus 30 (converting the DC voltage into a DC voltage of a different value) to charge the power storage device 50. More specifically, the bidirectional DC/DC converter 61 boosts the voltage of the power storage device 50 and lowers the voltage Vbus on the DC bus 30. The bidirectional DC/DC converter 61 functions as a voltage conversion circuit (second voltage conversion circuit).

The controller 62 controls the bidirectional DC/DC converter 61 based on the control by the controller 23 via the communication line L1. Further, when the voltage Vbus on the DC bus 30 is higher than a predetermined second threshold voltage Vth2, the controller 62 causes the bidirectional DC/DC converter 61 to lower the DC voltage output from the bidirectional DC/DC converter 61 to the DC bus 30 to a level equal to or lower than the second threshold voltage Vth2 irrespective of the control by the controller 23. The second threshold voltage Vth2 is higher than the constant voltage Vs. The first threshold voltage Vth1 is different from the second threshold voltage Vth2 and higher than the second threshold voltage Vth2.

More specifically, when an output current is flowing from the bidirectional DC/DC converter 61 to the DC bus 30 and when the voltage Vbus on the DC bus 30 is higher than the second threshold voltage Vth2, the controller 62 causes the bidirectional DC/DC converter 61 to decrease the current output from the bidirectional DC/DC converter 61 to the DC bus 30. This lowers the voltage Vbus on the DC bus 30.

Further, when an output current is not flowing from the bidirectional DC/DC converter 61 to the DC bus 30 and when the voltage Vbus on the DC bus 30 is higher than the second threshold voltage Vth2, the controller 62 causes the bidirectional DC/DC converter 61 to cause a current to flow from the DC bus 30 to the bidirectional DC/DC converter 61 to charge the power storage device 50. This lower the voltage Vbus on the DC bus 30.

When the voltage Vbus on the DC bus 30 is higher than the second threshold voltage Vth2, the bus voltage calculator 63 calculates a bus voltage command value to lower the voltage Vbus on the DC bus 30. The controller 62 controls the bidirectional DC/DC converter 61 in accordance with the bus voltage command value calculated. The bus voltage command value in this case may indicate a level equal to or lower than the second threshold voltage Vth2 and may indicate a level different from the second threshold voltage Vth2. Further, when the voltage Vbus on the DC bus 30 is lower than the second threshold voltage Vth2, and, more specifically, when the voltage Vbus on the DC bus 30 is equal to or lower than a predetermined threshold voltage lower than the second threshold voltage Vth2, the controller 23 controls the bidirectional DC/DC converter 61 to control the output power of the power storage device 50. In this case, the controller 23 acquires the current command value from the controller 23 of the first power converter 20. The controller 23 of the first power converter 20 may determine a current command value by a publicly known method. For example, the controller 23 may determine a current command value so that the power flowing inversely is equal or lower than a predetermined level.

The features of the controllers 23, 62 may be implemented by the coordination of hardware resources and software resources, or hardware resources alone. An analog device, microcomputer, DSP, ROM, RAM, FPGA, and other LSIs can be used as hardware resources. Programs such as firmware can be used as software resources.

As described above, the first power converter 20 and the second power converter 60 are configured as separate components. Therefore, the first power converter 20 can be operated alone for photovoltaic power generation without providing the power storage device 50 and the second power converter 60 when the system is initially introduced. In this case, the initial introduction cost is reduced.

Moreover, the power storage device 50 and the second power converter 60 may be added to the first power converter 20 already installed. The first power converter 20 and the second power converter 60 are connected by the DC bus 30 and the communication line L1 and so can be connected easily. Accordingly, the converters can be installed easily. By connecting the first power converter 20 and the second power converter 30, the power conversion system 1 functions as a generation and storage power conditioner. This makes it possible to store power in the power storage device 50 and to output an AC power by using the power in the power storage device 50 in addition to the power generated by the solar cell 10. Accordingly, the amount of power bought can be reduced and the system can be used as an emergency power supply for use when, for example, power goes off at night.

A description will now be given of the overall operation of the power conversion system 1. While the solar cell 10 is generating power, the DC/DC converter 21 boosts the DC voltage generated by the solar cell 10 and outputs the boosted voltage to the DC bus 30. The bidirectional inverter 22 converts the DC power on the DC bus 30 into an AC power and outputs the power as converted to the load 40 and the power system 46.

When the power generated by the solar cell 10 is relatively large, the bidirectional DC/DC converter 61 can charge the power storage device 50 based on the DC power on the DC bus 30. When the power generated by the solar cell 10 is relatively small, or when the solar cell 10 is not generating power, the bidirectional DC/DC converter 61 can convert the DC power in the power storage device 50 for output to the DC bus 30.

When the solar cell 10 is not generating power and when the power storage device 50 is charged, the bidirectional inverter 22 converts the AC power in the power system 46 into a DC power for output to the DC bus 30. The bidirectional DC/DC converter 61 uses the DC power on the DC bus 30 to charge the power storage device 50.

These operations are performed in the first power converter 20 under the control of the controller 23 and performed in the second power converter 60 under the control of the controller 62. The user can use a remote controller (not shown) to direct the controller 23 of the first power converter 20 to operate the power conversion system 1.

Of the AC power output from the bidirectional inverter 22, the power that is not consumed in the load 40 flows inversely to the power system 46 via the power line 44. Under the current system, it is not permitted to cause the power discharged from the power storage device 50 to flow inversely. Thus, when an inverse power flow is detected while the power storage device 50 is discharging power, the controller 23 controls the bidirectional inverter 22 to suppress the AC output power to stop the inverse power flow, as described above. When an inverse power flow occurs while the power storage device 50 is discharging power, it is necessary to stop the inverse power flow relatively promptly within a time limit on the order of 100-1000 milliseconds. In this embodiment, the controller 23 can directly control the bidirectional inverter 22 so that it is possible to stop the inverse power flow relatively promptly. In other words, it is not necessary to use special high-speed communication via the communication line L1 since it is not necessary to control the second power converter 60 via the communication line L1 to stop the inverse power flow.

Figure 2:
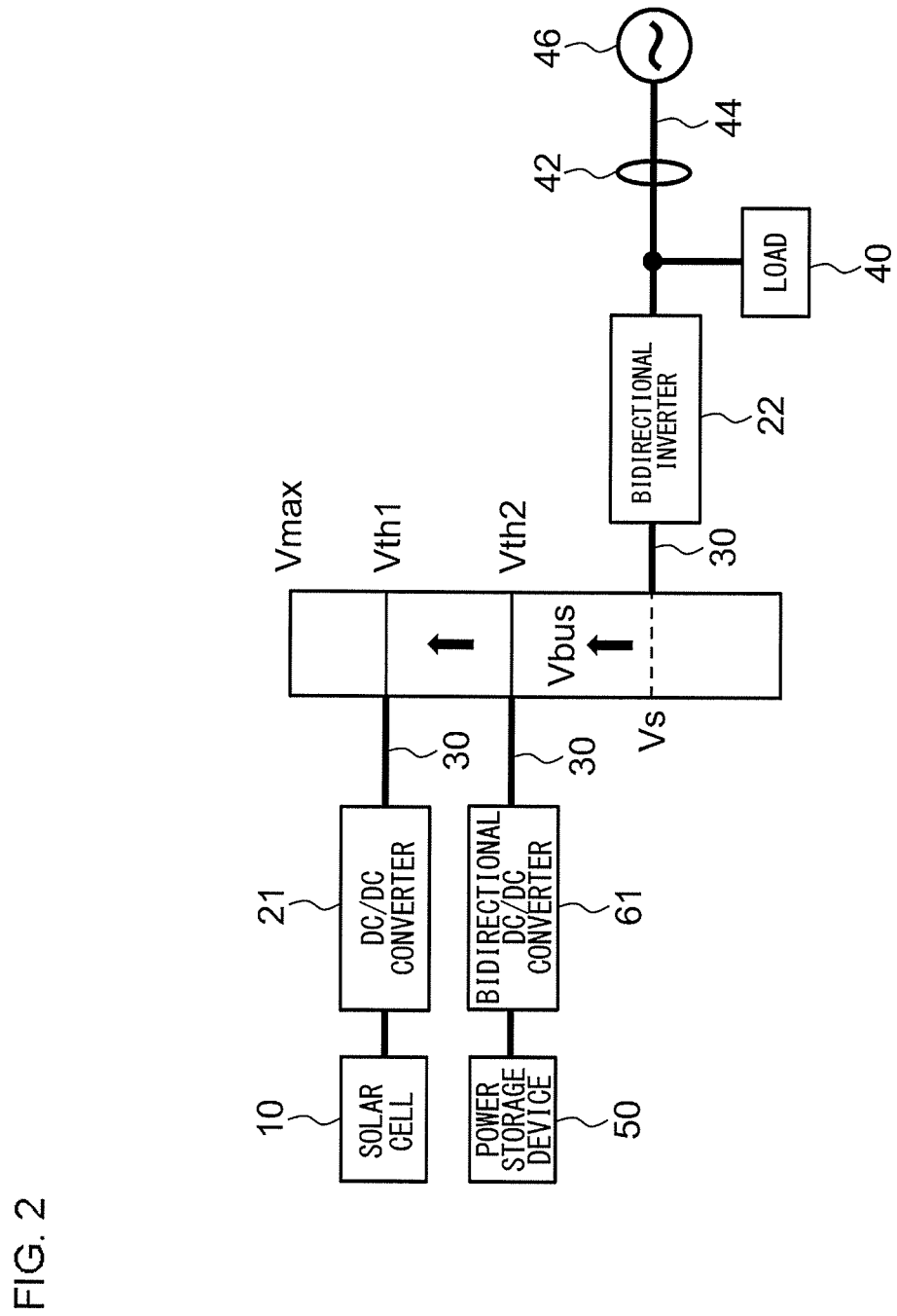
FIG. 2 shows a change in the voltage on the DC bus of the power conversion system of FIG. 1.

FIG. 2 shows a change in the voltage Vbus on the DC bus 30 of the power conversion system 1 of FIG. 1. When it is not necessary to suppress the output, the voltage Vbus on the DC bus 30 is controlled to approach the constant voltage Vs by using the bidirectional inverter 22 to regulate the AC power. This maintains power equilibrium. In this case, the first threshold voltage Vth1 and the second threshold voltage Vth2 are higher the constant voltage Vs so that the DC/DC converter 21 and the bidirectional DC/DC converter 61 do not lower the DC voltage output to the DC bus 30.

When an inverse power flow occurs while the power storage device 50 is discharging power and the bidirectional inverter 22 suppresses the AC power, a portion of the DC power supplied from the power storage device 50 will be an excess power on the DC bus 30, and the excess power raises the voltage Vbus on the DC bus 30 higher than the constant voltage Vs.

When the voltage Vbus on the DC bus 30 becomes consequently higher than the second threshold voltage Vth2, the bidirectional DC/DC converter 61 decreases the output current and lowers the voltage Vbus to a level equal to or lower than the second threshold voltage Vth2. When the solar cell 10 is not generating power in this case, the voltage Vbus on the DC bus 30 is maintained at a level equal to or lower than the second threshold voltage Vth2 by controlling the output current of the bidirectional DC/DC converter 61 to be small. This maintains power equilibrium.

When the solar cell 10 is generating power in this case, the power generated by the solar cell 10 causes the voltage Vbus on the DC bus 30 to be higher than the second threshold voltage Vth2 even when the output current of the bidirectional DC/DC converter 61 becomes zero. Thus, the bidirectional DC/DC converter 61 causes the current to flow from the DC bus 30 to charge the power storage device 50. This maintains the voltage Vbus on the DC bus 30 equal to or lower than the second threshold voltage Vth2 substantially while the power storage device 50 is charged. This maintains power equilibrium.

When the power storage device 50 is nearly fully charged, the power generated by the solar cell 10 raises the voltage Vbus on the DC bus 30 higher than the second threshold voltage Vth2. When the voltage Vbus on the DC bus 30 becomes higher than the first threshold voltage Vth1, the DC/DC converter 21 lowers the voltage Vbus to a level equal to or lower than the first threshold voltage Vth1. This maintains the voltage Vbus on the DC bus 30 at a level substantially equal to or lower than the first threshold voltage Vth1 substantially. This maintains power equilibrium.

Thus, the bidirectional DC/DC converter 61 for the power storage device 50 can determine whether to lower the voltage Vbus based on the voltage Vbus on the DC bus 30. Therefore, power equilibrium is maintained in the power conversion system 1 as a whole without using a command from the first power converter 20 by high-speed communication.

In this embodiment, the priority of power supply from the solar cell 10 is higher than the priory of power supply from the power storage device 50. The first threshold voltage Vth1 and the second threshold voltage Vth2 are defined in accordance with the priority, and the first threshold voltage Vth1 is configured to be higher than the second threshold voltage Vth2. Therefore, when the voltage Vbus on the DC bus 30 becomes higher than the constant voltage Vs, power supply from the power storage device 50 is suppressed earlier than that of the solar cell 10 so that the power generated by the solar cell 10 can be used in preference. Thus, the system can be configured to adapt to the characteristics of the respective DC power supplies.

When the voltage Vbus on the DC bus 30 exceeds the maximum voltage Vmax higher than the first threshold voltage Vth1 for some reason, the controller 23 stops the operation of the DC/DC converter 21, the bidirectional inverter 22, and the bidirectional DC/DC converter 61 to lower the voltage Vbus on the DC bus 30. By setting the maximum voltage Vmax to be equal in the DC/DC converter 21, the bidirectional inverter 22, and the bidirectional DC/DC converter 61, the components of the power conversion system 1 can be stopped at the same time.

Thus, according to the embodiment, the first power converter 20 and the second power converter 60 are configured as separate components. Therefore, the first power converter 20 may be installed when the system is initially introduced, and, subsequently, the second power converter 60 may be connected to the first power converter 20 to build the power conversion system 1 as a generation and storage power conditioner. Accordingly, the configuration of the power conversion system 1 can be modified easily. Further, the power conversion system 1 as a generation and storage power conditioner suppresses the AC power supplied by the bidirectional inverter 22 to raise the voltage Vbus on the DC bus 30, when it is necessary to suppress the output. Therefore, the second power converter 60 can be notified of the output suppression by identifying an increase in the voltage Vbus. Therefore, each of the first power converter 20 and the second power converter 60 can regulate the input and output of power to and from the DC bus 30.

Further, the AC power supplied by the bidirectional inverter 22 is suppressed when it is necessary to suppress the output. Therefore, the AC power output from the first power converter 20 is suppressed promptly and properly irrespective of the operation of the power storage device 50 and the second power converter 60. In other words, even when the first power converter 20 and the second power converter 60 are configured as separate components, an inverse power flow is promptly and properly suppressed while the power storage device 50 is discharging power, without using costly high-speed communication between the converters. In essence, power suppression in the power conversion system 1 can be performed with a simple configuration. Accordingly, the configuration of the power conversion system 1 can be modified easily in such a manner that the cost of the power conversion system 1 is prevented from increasing.

Second Embodiment

In the first embodiment, the DC/DC converter 21 and the bidirectional inverter 22 are integrated in the first power converter 20. The second embodiment differs from the first embodiment in that the DC/DC converter 21 and the bidirectional inverter 22 are configured as separate devices. The following description highlights the difference from the first embodiment.

Figure 3:
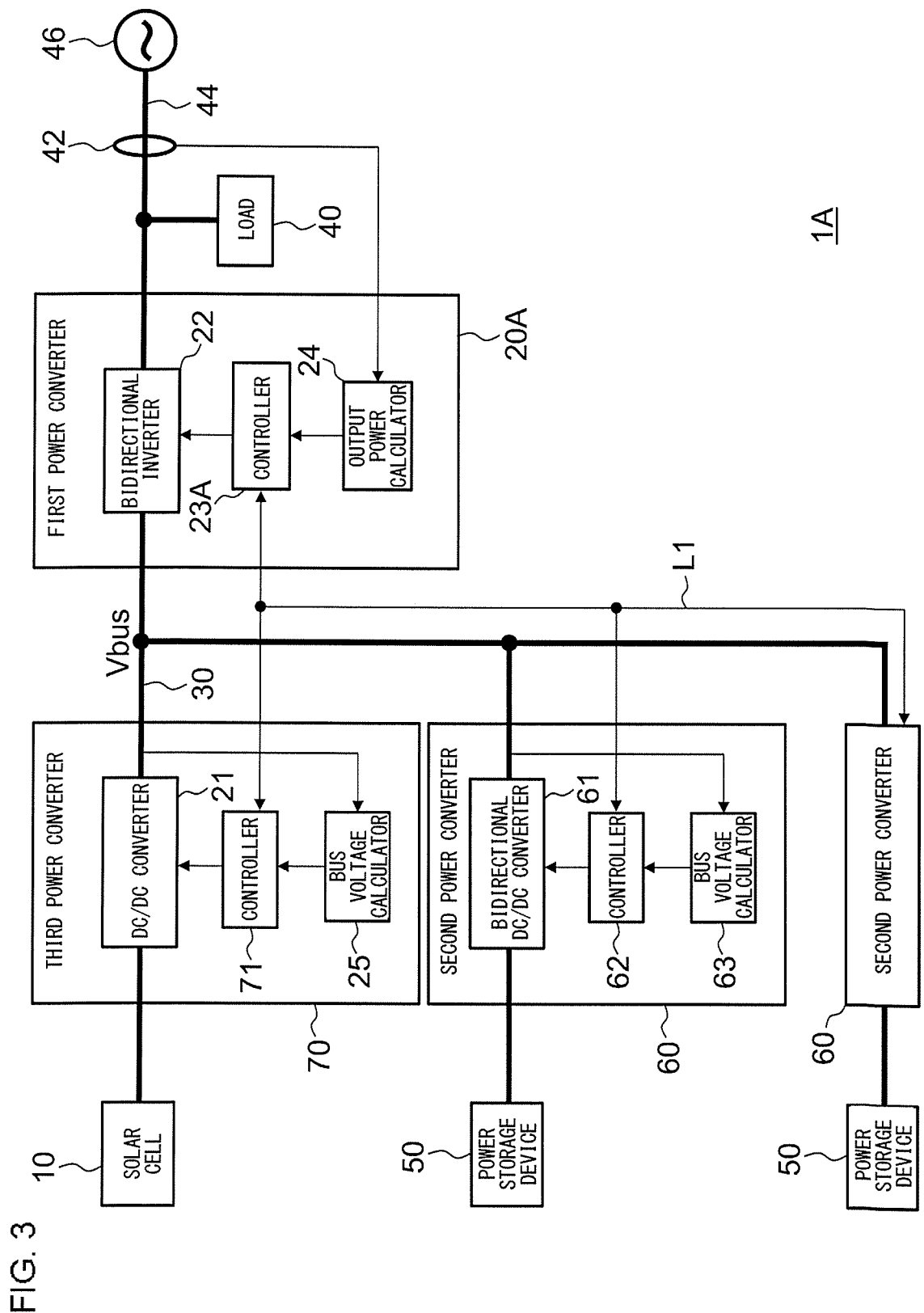
FIG. 3 schematically shows the configuration of a power conversion system according to the second embodiment.

FIG. 3 schematically shows the configuration of a power conversion system 1A according to the second embodiment. The power conversion system 1A includes a first power converter 20A and a third power converter 70 in place of the first power converter 20 of FIG. 1. The first power converter 20A and the third power converter 70 may be housed in different housings or housed in the same housing.

The first power converter 20A includes the bidirectional inverter 22, a controller 23A, and the output power calculator 24. The third power converter 70 includes the DC/DC converter 21, a controller 71 (third controller), and the bus voltage calculator 25. Thus, the first power converter 20 of FIG. 1 is divided into the first power converter 20A and the third power converter 70, and the controller 23 of FIG. 1 is divided into the controller 23A and the controller 71. In this system, the DC/DC converter 21 functions as a third voltage conversion circuit.

Of the functions of the controller 23 of FIG. 1, the controller 23A has the functions other than that of the control of the DC/DC converter 21. The controller 23A communicates with the controllers 62, 71 via the communication line L1.

Of the functions of the controller 23 of FIG. 1, the controller 71 has the function related to the control of the DC/DC converter 21. In other words, the controller 71 causes the DC/DC converter 21 to lower the DC voltage output from the DC/DC converter 21 to the DC bus 30 when the voltage Vbus on the DC bus 30 is higher than the first threshold voltage Vth1.

With such a configuration, the power conversion system 1A operates in the same manner as the power conversion system 1 of FIG. 1.

According to the embodiment, the first power converter 20A, the second power converter 60, and the third power converter 70 are configured as separate components so that the flexibility of the configuration of the power conversion system 1A is increased. For example, the first power converter 20A and the second power converter 60 may be installed when the system is initially introduced. Alternatively, when the system is initially introduced, a DC power supply may be directly connected to the DC bus 30 of the first power converter 20A, and the second power converter 60 and the third power converter 70 may not be provided. Moreover, the advantage of the first embodiment is equally provided.

Described above is an explanation based on an exemplary embodiment. The embodiment is intended to be illustrative only and it will be understood by those skilled in the art that various modifications to constituting elements and processes could be developed and that such modifications are also within the scope of the present invention.

For example, the communication line L1 may not be used. In this variation, the user uses a remote controller (not shown) to designate, in the controller 23, 23A of the first power converter 20, 20A, that the power storage device 50 and the second power converter 60 are connected. The controller 23, 23a controls the bidirectional inverter 22 to suppress the AC output power when the power storage device 50 is connected and when an inverse power flow is detected. Thus, an inverse power flow is stopped even when the power storage device 50 is not discharging power and when the inverse power flow has occurred due to the power generated by the solar cell 10. In this variation, the communication line L1 is not necessary so that the cost is further reduced. In addition, the second power converter 60 and the third power converter 70 can be installed still more easily.

Further, the priority of power supply from the solar cell 10 may be lower than the priority of supply from the power storage device 50. In this case, the first threshold voltage Vth1 is lower than the second threshold voltage Vth2. In this variation, the power in the power storage device 50 can be used in preference.

Further, the first embodiment may be modified such that the solar cell 10 and the power storage device 50 are interchanged, the DC/DC converter 21 and the bidirectional DC/DC converter 61 are interchanged, and the functions of the controller 23 and the controller 62 are modified in association. In this case, the solar cell 10 functions as the second DC power source, and the power storage device 50 functions as the first DC power source. The DC/DC converter 21 functions as the second voltage conversion circuit, and the bidirectional DC/DC converter 61 functions as the second voltage conversion circuit.

The embodiments may be defined by the following items.

[Item 1]

A power converter (20, 20A) including:

a DC bus (30) that is supplied with a DC power from a voltage conversion circuit (21, 61) for regulating a voltage of a power output from a DC power supply (10, 50), a voltage of the DC power being regulated by the voltage conversion circuit (21, 61);

an inverter (22) that converts the DC power on the DC bus (30) into an AC power and supplies the AC power as converted to a power system (46); and a controller (23, 23A) that controls the inverter (22). When it is necessary to suppress an output, the controller (23, 23A) suppresses the AC power supplied by the inverter (22) to increase a voltage (Vbus) on the DC bus (30).

[Item 2]

The power converter (20, 20A) according to item 1, further including: a detector (42) that detects a power that flows inversely into the power system (46), wherein the controller (23, 23A) suppresses the AC power supplied by the inverter (22) so that the power flowing inversely is equal to or lower than a predetermined level.

[Item 3]

The power converter (20) according to item 1 or item 2, further including: a voltage conversion circuit (21) that is provided between the DC power supply (10) and the DC bus (30), regulates the voltage of the power output from the DC power supply, and supplies the regulated voltage to the DC bus (30), wherein when a voltage (Vbus) on the DC bus (30) is higher than a predetermined threshold voltage (Vth1), the controller (23) controls the voltage conversion circuit (21) so that the voltage (Vbus) on the DC bus (30) is equal to or lower than the threshold voltage (Vth1), and, when the voltage (Vbus) on the DC bus (30) is lower than the threshold voltage (Vth1), the controller (23) controls the voltage conversion circuit (21) to control the power output from the DC power supply (10).

[Item 4]

The power converter (20) according to item 3, wherein, when it is not necessary to suppress the output, the controller

(23) controls the inverter (22) so that the voltage (Vbus) on the DC bus (30) approaches a predetermined constant voltage (Vs), and the threshold voltage (Vth1) is higher than the constant voltage (Vs).

[Item 5]

A power conversion system (1, 1A) including: a first power converter (20, 20A) that includes a DC bus (30) supplied with a power output from a first DC power supply (10, 50), an inverter (22) that converts a DC power on the DC bus (30) into an AC power and supplies the AC power as converted to a power system, and a first controller (23, 23A) that controls the inverter (22); and a second power converter (60) that includes: a second voltage conversion circuit (61, 21) that regulates a voltage of a power output from a second DC power supply (50, 10) and supplies a DC power with a regulated voltage to the DC bus (30); and a second controller (62) that controls the second voltage conversion circuit (61, 21), wherein when it is necessary to suppress an output, the first controller (23, 23A) suppresses the AC power supplied by the inverter (22) to increase a voltage (Vbus) on the DC bus (30), and when the voltage (Vbus) on the DC bus (30) is higher than a predetermined second threshold voltage (Vth2), the second controller (62) controls the voltage (Vbus) on the DC bus (30) to be equal to or lower than the second threshold voltage (Vth2), and, when the voltage (Vbus) on the DC bus (30) is lower than the second threshold voltage (Vth2), the second controller (62) controls the power output from the second DC power supply (50, 10).

[Item 6]

The power conversion system (1, 1A) according to item 5, wherein, when it is not necessary to suppress the output, the first controller (23, 23A) controls the inverter (22) so that the voltage (Vbus) on the DC bus (30) approaches a predetermined constant voltage (Vs), and the second threshold voltage (Vth2) is higher than the constant voltage (Vs).

[Item 7]

The power conversion system (1) according to item 6, wherein the first power converter (20) includes a first voltage conversion circuit (21, 61) that is provided between the first DC power supply (10, 50) and the DC bus (30), regulates the voltage of the power output from the first DC power supply (10, 50), and supplies the regulated voltage to the DC bus (30), wherein when a voltage (Vbus) on the DC bus (30) is higher than a predetermined first threshold voltage (Vth1), the first controller (23) controls the first voltage conversion circuit (21, 61) so that the voltage (Vbus) on the DC bus (30) is equal to or lower than the first threshold voltage (Vth1), and, when the voltage (Vbus) on the DC bus (30) is lower than the first threshold voltage (Vth1), the first controller (23) controls the first voltage conversion circuit (21, 61) to control the power output from the first DC power supply (10, 50).

[Item 8]

The power conversion system (1) according to item 7, wherein the first DC power supply (10) is a solar cell (10), the second DC power supply (50) is a power storage device (50), and the first threshold voltage (Vth1) is higher than the second threshold voltage (Vth2).

[Item 9]

The power conversion system (1) according to item 8, wherein the second voltage conversion circuit (61) is capable of converting a voltage bidirectionally, and the second controller (62):

causes the second voltage conversion circuit (61) to decrease a current output from the second voltage conversion circuit (61) to the DC bus (30) when an output current flows from the second voltage conversion circuit (61) to the DC bus (30) and when the voltage (Vbus) on the DC bus (30) is higher than the second threshold voltage (Vth2), and causes the second voltage conversion circuit (61) to cause a current to flow from the DC bus (30) to the second voltage conversion circuit (61) to charge the power storage device (50), when an output current is not flowing from the second voltage conversion circuit (61) to the DC bus (30) and when the voltage (Vbus) on the DC bus (30) is higher than the second threshold voltage (Vth2).

[Item 10]

The power conversion system (1) according to item 7, wherein the first DC power supply (50) is a power storage device (50), the second DC power supply (10) is a solar cell (10), and the first threshold voltage (Vth1) is lower than the second threshold voltage (Vth2).

[Item 11]

The power conversion system (1) according to item 10, wherein the first voltage conversion circuit (61) is capable of converting a voltage bidirectionally, and the first controller (23):

causes the first voltage conversion circuit (61) to decrease a current output from the first voltage conversion circuit (61) to the DC bus (30) when an output current flows from the first voltage conversion circuit (61) to the DC bus (30) and when the voltage (Vbus) on the DC bus (30) is higher than the first threshold voltage (Vth1), and causes the first voltage conversion circuit (61) to cause a current to flow from the DC bus (30) to the first voltage conversion circuit (61) to charge the power storage device (50), when an output current is not flowing from the first voltage conversion circuit (61) to the DC bus (30) and when the voltage (Vbus) on the DC bus (30) is higher than the first threshold voltage (Vth1).

[Item 12]

The power conversion system (1A) according to item 5, further including: a third power converter (70) that includes: a third voltage conversion circuit (21) that is provided between the first DC power supply (10) and the DC bus (30), regulates the voltage of the power output from the first DC power supply (10), and supplies the regulated voltage to the DC bus (30); and a third controller (71) that controls the third voltage conversion circuit (21), wherein, when the voltage (Vbus) on the DC bus (30) is higher than a predetermined first threshold voltage (Vth1), the third controller (71) controls the third voltage conversion circuit (21) so that the voltage (Vbus) on the DC bus (30) is equal to or lower than the first threshold voltage (Vth1), and, when the voltage (Vbus) on the DC bus (30) is lower than the first threshold voltage (Vth1), the third controller (71) controls the third voltage conversion circuit (21) to control the power output from the first DC power supply (10).

[Item 13]

A power converter (70, 60) connected to another power converter (20, 20A) including: an inverter (22) that converts a DC power on a DC bus (30) into an AC power and supplies the AC power as converted to a power system (46); and a controller (23, 23A) that suppresses, when it is necessary to suppress an output, the AC power supplied by the inverter

(22) to increase a voltage (Vbus) on the DC bus (30), the power converter (70, 60) including:
a voltage conversion circuit (21, 61) that regulates a voltage of a power output from a DC power supply (10, 50) and outputs the regulated voltage to the DC bus (30); and
a controller (71, 62) that controls, when the voltage (Vbus) on the DC bus (30) is higher than a predetermined threshold voltage (Vth1, Vth2), the voltage conversion circuit (21, 61) so that the voltage (Vbus) on the DC bus (30) is equal to or lower than the threshold voltage (Vth1, Vth2), and controls, when the voltage (Vbus) on the DC bus (30) is lower than the threshold voltage (Vth1, Vth2), the voltage conversion circuit (21, 61) to control the power output from the DC power supply (10, 50).

[Item 14]

A method for controlling a power converter (20, 20A) including a DC bus (30) that is supplied with a DC power from a voltage conversion circuit (21, 61) for regulating a voltage of a power output from a DC power supply (10, 50), a voltage of the DC power being regulated by the voltage conversion circuit (21, 61); and an inverter (22) that converts the DC power on the DC bus (30) into an AC power and supplies the AC power as converted to a power system (46), the method including:
suppressing, when it is necessary to suppress an output, an AC power supplied by the inverter (22) to increase a voltage (Vbus) on the DC bus (30).

REFERENCE SIGNS LIST 1, 1A . . . power conversion system, 10 . . . solar cell, 20, 20A . . . first power converter, 21 . . . DC/DC converter, 22 . . . bidirectional inverter, 23, 23A . . . controller, 30 . . . DC bus, 40 . . . load, 42 . . . current detector, 44 . . . power line, 46 . . . power system, 50 . . . power storage device, 60 . . . second power converter, 61 . . . bidirectional DC/DC converter, 62 . . . controller, 70 . . . third power converter, 71 . . . controller

INDUSTRIAL APPLICABILITY

The present disclosure is applicable to a power converter for converting power supplied from a DC power supply.

The invention claimed is:

1. A power converter comprising:
a DC bus that is supplied with a DC power from a voltage conversion circuit for regulating a voltage of a power output from a DC power supply, a voltage of the DC power being regulated by the voltage conversion circuit;
an inverter that converts the DC power on the DC bus into an AC power and supplies the AC power as converted to a power system; and
a controller that controls the inverter, wherein
when a condition to suppress an output is not satisfied, the controller controls the inverter so that a voltage on the DC bus approaches a constant voltage, and
when the condition to suppress the output is satisfied while the controller controls the inverter so that the voltage on the DC bus approaches the constant voltage, the controller suppresses the AC power supplied by the inverter to increase the voltage on the DC bus to become higher than the constant voltage.

2. The power converter according to claim 1, further comprising:
a detector that detects a power that flows inversely into the power system, wherein
the condition to suppress the output includes the power flowing inversely being detected, and
when the condition to suppress the output is satisfied, the controller suppresses the AC power supplied by the inverter so that the power flowing inversely is equal to or lower than a predetermined level.

3. The power converter according to claim 1, further comprising:
a voltage conversion circuit that is provided between the DC power supply and the DC bus, regulates the voltage of the power output from the DC power supply, and supplies the regulated voltage to the DC bus, wherein
when a voltage on the DC bus is higher than a predetermined threshold voltage, the controller controls the voltage conversion circuit so that the voltage on the DC bus is equal to or lower than the threshold voltage, and, when the voltage on the DC bus is lower than the threshold voltage, the controller controls the voltage conversion circuit to control the power output from the DC power supply.

4. The power converter according to claim 3, wherein the threshold voltage is higher than the constant voltage.

5. A power conversion system comprising:
a first power converter that includes a DC bus supplied with a power output from a first DC power supply, an inverter that converts a DC power on the DC bus into an AC power and supplies the AC power as converted to a power system, and a first controller that controls the inverter; and
a second power converter that includes: a second voltage conversion circuit that regulates a voltage of a power output from a second DC power supply and supplies a DC power with a regulated voltage to the DC bus; and a second controller that controls the second voltage conversion circuit, wherein
when a condition to suppress an output is not satisfied, the first controller controls the inverter so that a voltage on the DC bus approaches a constant voltage, when the condition to suppress the output is satisfied while the controller controls the inverter so that the voltage on the DC bus approaches the constant voltage, the first controller suppresses the AC power supplied by the inverter to increase the voltage on the DC bus to become higher than the constant voltage, and
when the voltage on the DC bus is higher than a predetermined second threshold voltage, the second controller controls the voltage on the DC bus to be equal to or lower than the second threshold voltage, and, when the voltage on the DC bus is lower than the second threshold voltage, the second controller controls the power output from the second DC power supply.

6. The power conversion system according to claim 5, wherein
the second threshold voltage is higher than the constant voltage.

7. The power conversion system according to claim 6, wherein
the first power converter includes a first voltage conversion circuit that is provided between the first DC power supply and the DC bus, regulates the voltage of the power output from the first DC power supply, and supplies the regulated voltage to the DC bus, wherein
when a voltage on the DC bus is higher than a predetermined first threshold voltage, the first controller controls the first voltage conversion circuit so that the voltage on the DC bus is equal to or lower than the first threshold voltage, and, when the voltage on the DC bus is lower than the first threshold voltage, the first controller controls the first voltage conversion circuit to control the power output from the first DC power supply.

8. The power conversion system according to claim 7, wherein
the first DC power supply is a solar cell, the second DC power supply is a power storage device, and the first threshold voltage is higher than the second threshold voltage.

9. The power conversion system according to claim 8, wherein
the second voltage conversion circuit is capable of converting a voltage bidirectionally, and the second controller:
causes the second voltage conversion circuit to decrease a current output from the second voltage conversion circuit to the DC bus when an output current flows from the second voltage conversion circuit to the DC bus and when the voltage on the DC bus is higher than the second threshold voltage, and
causes the second voltage conversion circuit to cause a current to flow from the DC bus to the second voltage conversion circuit to charge the power storage device, when an output current is not flowing from the second voltage conversion circuit to the DC bus and when the voltage on the DC bus is higher than the second threshold voltage.

10. The power conversion system according to claim 7, wherein
the first DC power supply is a power storage device, the second DC power supply is a solar cell, and the first threshold voltage is lower than the second threshold voltage.

11. The power conversion system according to claim 10, wherein
the first voltage conversion circuit is capable of converting a voltage bidirectionally, and the first controller:
causes the first voltage conversion circuit to decrease a current output from the first voltage conversion circuit to the DC bus when an output current flows from the first voltage conversion circuit to the DC bus and when the voltage on the DC bus is higher than the first threshold voltage, and
causes the first voltage conversion circuit to cause a current to flow from the DC bus to the first voltage conversion circuit to charge the power storage device, when an output current is not flowing from the first voltage conversion circuit to the DC bus and when the voltage on the DC bus is higher than the first threshold voltage.

12. The power conversion system according to claim 5, further comprising:
a third power converter that includes: a third voltage conversion circuit that is provided between the first DC power supply and the DC bus, regulates the voltage of the power output from the first DC power supply, and supplies the regulated voltage to the DC bus; and a third controller that controls the third voltage conversion circuit, wherein
when the voltage on the DC bus is higher than a predetermined first threshold voltage, the third controller controls the third voltage conversion circuit so that the voltage on the DC bus is equal to or lower than the first threshold voltage, and, when the voltage on the DC bus is lower than the first threshold voltage, the third controller controls the third voltage conversion circuit to control the power output from the first DC power supply.

13. A power converter connected to another power converter including: an inverter that converts a DC power on a DC bus into an AC power and supplies the AC power as converted to a power system; and a controller that controls, when a condition to suppress an output is not satisfied, the inverter so that a voltage on the DC bus approaches a constant voltage, and suppresses, when to the condition to suppress the output is satisfied while the controller controls the inverter so that the voltage on the DC bus approaches the constant voltage, the AC power supplied by the inverter to increase the voltage on the DC bus to become higher than the constant voltage, the power converter comprising:
a voltage conversion circuit that regulates a voltage of a power output from a DC power supply and outputs the regulated voltage to the DC bus; and
a controller that controls, when the voltage on the DC bus is higher than a predetermined threshold voltage, the voltage conversion circuit so that the voltage on the DC bus is equal to or lower than the threshold voltage, and controls, when the voltage on the DC bus is lower than the threshold voltage, the voltage conversion circuit to control the power output from the DC power supply.

14. A method for controlling a power converter including a DC bus that is supplied with a DC power from a voltage conversion circuit for regulating a voltage of a power output from a DC power supply, a voltage of the DC power being regulated by the voltage conversion circuit; and an inverter that converts the DC power on the DC bus into an AC power and supplies the AC power as converted to a power system, the method comprising:
controlling, when a condition to suppress an output is not satisfied, the inverter so that a voltage on the DC bus approaches a constant voltage, and
suppressing, when the condition to suppress the output is satisfied while controlling the inverter so that the voltage on the DC bus approaches the constant voltage, an AC power supplied by the inverter to increase the voltage on the DC bus higher than the constant voltage.

* * * * *